(12) United States Patent
Carroll et al.

(10) Patent No.: US 8,476,820 B2
(45) Date of Patent: Jul. 2, 2013

(54) SOLID STATE LIGHTING COMPOSITIONS AND SYSTEMS

(75) Inventors: David Loren Carroll, Winston-Salem, NC (US); Manoj A. G. Namboothiry, Winstom-Salem, NC (US)

(73) Assignee: Wake Forest University, Winston Salem, NC (US)

( * ) Notice: Subject to any disclaimer, the term of this patent is extended or adjusted under 35 U.S.C. 154(b) by 649 days.

(21) Appl. No.: 12/447,547

(22) PCT Filed: Nov. 1, 2007

(86) PCT No.: PCT/US2007/023055
§ 371 (c)(1),
(2), (4) Date: Apr. 28, 2009

(87) PCT Pub. No.: WO2008/143636
PCT Pub. Date: Nov. 27, 2008

(65) Prior Publication Data
US 2010/0053931 A1    Mar. 4, 2010

Related U.S. Application Data

(60) Provisional application No. 60/855,824, filed on Nov. 1, 2006.

(51) Int. Cl.
*F21V 9/16* (2006.01)
*H01L 21/28* (2006.01)

(52) U.S. Cl.
USPC .............. 313/502; 362/84; 977/742; 257/103

(58) Field of Classification Search
USPC .................... 362/84; 313/498, 501–503, 506, 313/509; 977/742; 257/103
See application file for complete search history.

(56) References Cited

U.S. PATENT DOCUMENTS

| | | | |
|---|---|---|---|
| 3,402,326 | A | 9/1968 | Guasco et al. |
| 4,075,449 | A | 2/1978 | Yagi et al. |
| 4,635,040 | A | 1/1987 | Masot |
| 4,663,690 | A | 5/1987 | Bonniau et al. |
| 4,706,073 | A | 11/1987 | Vila Masot |

(Continued)

FOREIGN PATENT DOCUMENTS

| | | |
|---|---|---|
| EP | 2078068 B1 | 1/2012 |
| JP | 2000268707 A | 9/2000 |

(Continued)

OTHER PUBLICATIONS

International Search Report mailed on Oct. 21, 2008 in International Application No. PCT/US2007/023055.

(Continued)

*Primary Examiner* — Anne Hines
*Assistant Examiner* — Jacob R Stern
(74) *Attorney, Agent, or Firm* — J. Clinton Wimbish; Smith Moore Leatherwood LLP

(57) ABSTRACT

The present invention relates to lighting technologies and, in particular, to solid state lighting technologies. In one embodiment, the present invention provides a lighting apparatus comprising a first electrode, a radiation transmissive second electrode, and a composite layer disposed between the first and second electrode, the composite layer comprising at least one electric field concentrator and at least one phosphor disposed in a radiation transmissive dielectric material.

39 Claims, 6 Drawing Sheets

U.S. PATENT DOCUMENTS

| | | | |
|---|---|---|---|
| 6,448,709 | B1 | 9/2002 | Chuang et al. |
| 6,798,127 | B2 | 9/2004 | Mao et al. |
| 7,005,679 | B2 | 2/2006 | Tarsa et al. |
| 7,040,948 | B2 | 5/2006 | Mao et al. |
| 7,254,009 | B2 | 8/2007 | Allen |
| 2004/0012027 | A1 | 1/2004 | Keller et al. |
| 2004/0174117 | A1* | 9/2004 | Han ............................ 313/506 |
| 2004/0183434 | A1* | 9/2004 | Yeh et al. ..................... 313/506 |
| 2004/0217364 | A1 | 11/2004 | Tarsa et al. |
| 2006/0138435 | A1 | 6/2006 | Tarsa et al. |
| 2006/0164002 | A1 | 7/2006 | O'Brien et al. |
| 2007/0210704 | A1* | 9/2007 | Park et al. ..................... 313/506 |

FOREIGN PATENT DOCUMENTS

| | | | |
|---|---|---|---|
| JP | 2002033193 A | 1/2002 | |
| JP | 2006 120328 A | 5/2006 | |
| JP | 2006 127780 A | 5/2006 | |
| WO | 03/107441 A2 | 12/2003 | |
| WO | 2004/100275 A1 | 11/2004 | |
| WO | 2005/107420 A2 | 11/2005 | |
| WO | 2005/107420 A3 | 11/2005 | |

OTHER PUBLICATIONS

J.T. Tsai et al., Plasma illumination devices enhanced by carbon nanotubes, Applied Physics Letters, Jan. 3, 2006, pp. 013104-1-013104-2, vol. 88, American Institute of Physics.

W. B. Choi et al., Fully sealed, high-brightness carbon-nanotube field-emission display, Applied Physics Letters, Nov. 15, 1999, pp. 3129-3131, vol. 75, No. 20, American Institute of Physics.

Q. H. Wang et al., A nanotube-based field-emission flat panel display, Applied Physics Letters, Jun. 1, 1998, pp. 2912-2913, vol. 72, No. 22, American Institute of Physics.

Sung Mi Jung et al., Clean Carbon Nanotube Field Emitters Aligned Horizontally, Nano Letters, Jun. 7, 2006, pp. 1569-1573, vol. 6, No. 7, American Chemical Society.

S.R.P. Silva et al., Electron field emission from carbon-based materials, Thin Solid Films, 2005, pp. 79-85, vol. 482, Elsevier B.V.

Yahachi Saito et al., Field emission from carbon nanotubes and its application to electron sources, Carbon, 2000, pp. 169-182, vol. 38, Elsevier Science Ltd.

Beom-Jin Yoon et al., Fabrication of Flexible Carbon Nanotube Field Emitter Arrays by Direct Microwave Irradiation on Organic Polymer Substrate, Journal of the American Chemical Society, May 20, 2005, pp. 8234-8235, vol. 127, No. 23, American Chemical Society.

J. D. Carey, Engineering the next generation of large-area displays: prospects and pitfalls, Phil. Trans. R. Soc. Lond. A, Nov. 3, 2003, pp. 2891-2907, vol. 361, The Royal Society.

M.S. Mousa et al., Stabilization of carbon-fiber cold field-emission cathodes with a dielectric coating, Ultramicroscopy, 2003, pp. 125-130, vol. 95, Elsevier Science B.V.

Intent to Grant for EP Appl. No. 07874099.0 dated Dec. 15, 2011.

Database WPI Week 200634 Thomas Scientific, London, GB; AN 2006-326119 XP002498497.

* cited by examiner

SOLID STATE LIGHTING COMPOSITIONS AND SYSTEMS

REFERENCE TO RELATED APPLICATIONS

The present application hereby claims priority under 35 U.S.C. §119(e) to U.S. Provisional Patent Application Ser. No. 60/855,824 filed Nov. 1, 2006 which is incorporated herein by reference.

STATEMENT OF GOVERNMENT LICENSE RIGHTS

This invention was made through the support of the Department of Defense-United States Air Force Office of Scientific Research (AFOSR) Grant No. FA9550-04-1-0161. The Federal Government may retain certain license rights in this invention.

FIELD OF THE INVENTION

The present invention relates to lighting technologies and, in particular, to solid state lighting technologies.

BACKGROUND OF THE INVENTION

Currently available lighting systems include incandescent, fluorescent, halogen, and high intensity discharge sources of light. Disadvantages exist within lighting systems based on these illumination sources, many related to efficiency. Presently, only about 30% of the electrical energy consumed in lighting applications results in the production of light. The remainder of the electrical energy is dissipated by non-radiative processes such as heat generation. Incandescent light sources, for example, consume 45% of all lighting energy but only produce 14% of the total light generated. Moreover, fluorescent lamps are only about four times as efficient as incandescent sources and still suffer from inherent energy loss.

New lighting technologies are being developed in attempts to overcome the disadvantages of current lighting systems. One such technology is based on light emitting diodes (LEDs). In general, light emitting diodes are constructed from semiconductor materials, and when biased, emit radiation. Depending on the semiconductor material used, the emitted radiation can fall within the ultraviolet, visible, or infrared regions of the electromagnetic spectrum. Light emitting diodes offer the advantages of enhanced lifetimes, reduced heat production, and rapid illumination times. Disadvantages of light emitting diodes, nevertheless, include temperature dependent performance characteristics, unidirectional light output, and narrow emission bands. The narrow emission characteristics of light emitting diodes require several diodes of varying emission profiles to be bundled in order to produce a white light source. Bundling light emitting diodes to produce a white light source is expensive making their use in many lighting applications cost prohibitive.

In view of the foregoing disadvantages, it would be desirable to provide lighting compositions and systems which offer alternatives to lighting systems based on incandescent, fluorescent, halogen, high intensity discharge, and light emitting diode technologies. It would additionally be desirable to provide methods of making such lighting compositions and systems.

SUMMARY

In one aspect, the present invention provides solid state compositions and systems for lighting applications. The present invention additionally provides methods of making solid state compositions and systems for lighting applications as well as methods for generating electromagnetic radiation. Lighting compositions, apparatus, and systems of the present invention offer alternatives to present lighting sources of incandescent light, fluorescent light, and LEDs.

In one embodiment, the present invention provides a lighting apparatus comprising a first electrode, a radiation transmissive second electrode, and a composite layer disposed between the first electrode and the second electrode, the composite layer comprising at least one electric field concentrator and at least one phosphor disposed in a radiation transmissive dielectric material. A phosphor, as used herein, refers to any chemical species which radiatively relaxes from an excited state. Moreover, radiation transmissive, as used herein, refers to the ability to at least partially pass radiation in the visible, infrared, and/or ultraviolet region of the electromagnetic spectrum. In some embodiments, radiation transmissive materials can pass visible electromagnetic radiation with minimal absorbance and/or other interference.

In some embodiments, the composite layer comprises a plurality of electric field concentrators and a plurality of phosphors disposed in a radiation transmissive dielectric material. In some embodiments, the first electrode is also radiation transmissive.

In some embodiments of a composite layer of a lighting apparatus of the present invention, one or a plurality of electric field concentrators are disposed in a first layer of a first radiation transmissive dielectric material, and one or a plurality of phosphors are disposed in a second layer of a second radiation transmissive dielectric material. The first and second radiation transmissive dielectric materials, in some embodiments, comprise the same material. In other embodiments, the first and second radiation transmissive dielectric materials comprise different materials. A composite layer, according to some embodiments of the present invention, can display any number of dielectric layers arranged in any manner, the dielectric layers independently comprising a plurality of electric field concentrators and/or a plurality of phosphors.

In some embodiments of a composite layer of a lighting apparatus of the present invention, one or a plurality of electric field concentrators are disposed in a first layer of a first radiation transmissive dielectric material, and one or a plurality of phosphors are disposed in a second layer of a radiation transmissive non-dielectric material. A radiation transmissive, non-dielectric material, in some embodiments, comprises conjugated polymers, semiconducting polymers, or combinations thereof. In some embodiments phosphors disposed in the radiation transmissive, non-dielectric material comprise a dielectric coating.

In some embodiments, a lighting apparatus of the present invention further comprises one or more radiation transmissive dielectric layers between the composite layer and the first electrode and/or second electrode. Radiation transmissive dielectric layers, in some embodiments, serve as buffer layers preventing or inhibiting dielectric breakdown of the lighting apparatus.

In some embodiments, radiation transmissive dielectric buffer layers can be disposed within the composite layer of a lighting apparatus. In one embodiment, for example, a radiation transmissive dielectric buffer layer can be disposed between a first layer comprising one or a plurality of electric field concentrators disposed in a first radiation transmissive dielectric material and a second layer comprising one or a plurality of phosphors disposed in a second radiation transmissive dielectric material. In another embodiment, a radiation transmissive dielectric buffer layer can be disposed between a first layer comprising at least one electric field concentrator and at least one phosphor disposed in a radiation transmissive first dielectric material and a second layer comprising at least one electric field concentrator and at least one phosphor disposed in a radiation transmisive second dielectric material.

In another embodiment, the present invention provides a lighting system comprising at least one lighting apparatus and at least one electrical circuit coupled to the lighting apparatus. Lighting apparatus suitable for coupling to at least one electrical circuit can comprise any of the lighting apparatus provided herein. In one embodiment of a lighting system of the present invention, for example, the at least one lighting apparatus comprises a first electrode, a radiation transmissive second electrode, and a composite layer disposed between the first electrode and second electrode, wherein the composite layer comprises at least one electric field concentrator and at least one phosphor disposed in a radiation transmissive dielectric material. In some embodiments, a plurality of electrical circuits are coupled to the at least one lighting apparatus.

A lighting system, according to some embodiments of the present invention, comprises a plurality of lighting apparatus coupled to at least one electrical circuit. In some embodiments, the at least one electrical circuit is the same for each of the plurality of lighting apparatus. In other embodiments, the at least one electrical circuit is different for each of the plurality of lighting apparatus.

Lighting systems of the present invention, according to some embodiments, further comprise housings and/or fixtures for one or a plurality of lighting apparatus. Housings and/or fixtures, in some embodiments, comprise protective covers, panels, tiles, frames, and/or other enclosures Lighting systems of the present invention, in some embodiments, have an operating voltage of 120 VAC +/−10% of nominal. In other embodiments, lighting systems of the present invention have an operating voltage ranging from about 10 VAC to about 220 VAC. In another embodiment, the operating voltage of a lighting system of the present invention ranges from about 20 VAC to about 440 VAC.

Moreover, in some embodiments, the frequency of the electric field resulting from the applied VAC ranges from about 16 Hz to about 16000 Hz. In other embodiments, the frequency of the electric field is about 50 Hz or about 60 Hz. In another embodiment, the frequency of the electric field is about 200 Hz or about 400 Hz. In a further embodiment, the frequency of the electric field is about 800 Hz or about 1200 Hz. In one embodiment, the frequency of the electric field is about 1600 Hz.

In some embodiments, lighting systems of the present invention are operable receive DC operating voltages ranging from about 5 V to about 1000 V or from about 100 V to about 500 V. In another embodiment, a lighting system of the present invention has a DC operating voltage of about 12 V.

In another aspect, the present invention provides methods of producing lighting apparatus and systems. In one embodiment, a method of producing a lighting apparatus comprises providing a first electrode, providing a radiation transmissive second electrode, providing a composite layer, and disposing the composite layer between the first electrode and the second electrode, wherein the composite layer comprises at least one electric field concentrator and at least one phosphor disposed in a radiation transmissive dielectric material. In some embodiments, providing a composite layer comprises disposing at least one electric field concentrator and at least one phosphor in a radiation transmissive dielectric material. In other embodiments, providing a composite layer comprises disposing at least one electric field concentrator in a first layer of a first radiation transmissive dielectric material and disposing at least one phosphor in a second layer of a second radiation transmissive dielectric material adjacent to the first layer.

A method of producing a lighting system, in some embodiments, comprises providing at least one lighting apparatus and coupling the at least one lighting apparatus to at least one electrical circuit. Lighting apparatus suitable for coupling to at least one electrical circuit can comprise any of the lighting apparatus provided herein. In one embodiment, a lighting apparatus comprises a first electrode, a radiation transmissive second electrode, and a composite layer disposed between the first electrode and the second electrode, the composite layer comprising at least one electric field concentrator and at least one phosphor disposed in a radiation transmissive dielectric material. In some embodiments, the lighting apparatus comprises a plurality of electric field concentrators and a plurality of phosphors. In some embodiments, a method of producing a lighting system comprises coupling at least one lighting apparatus to a plurality of electrical circuits.

In another embodiment, a method of producing a lighting system comprises providing a plurality of lighting apparatus of the present invention and coupling each of the plurality of lighting apparatus to at least one electrical circuit. In some embodiments, the at least one electrical circuit is the same for each of the plurality of lighting apparatus. In other embodiments, the at least one electrical circuit is different for each of the plurality of lighting apparatus.

In a further aspect, the present invention provides methods for producing electromagnetic radiation. In one embodiment, a method of producing electromagnetic radiation comprises providing a composite layer comprising at least one electric field concentrator and at least one phosphor disposed in a radiation transmissive dielectric material, disposing the composite layer in an electric field, activating the at least one phosphor, and emitting radiation from the at least one phosphor. In another embodiment, a method of producing electromagnetic radiation comprises providing a composite layer comprising at least one electric field concentrator disposed in a first layer of a first radiation transmissive dielectric material and at least one phosphor disposed in a second layer of a second radiation transmissive dielectric material, disposing the composite layer in a an electric field, activating the at least one phosphor, and emitting radiation from the at least one phosphor.

In some embodiments of methods of producing electromagnetic radiation, activating the at least one phosphor comprises transferring charge from at least one electric field concentrator to the at least one phosphor. Charge, according to some embodiments, comprises electrons. In other embodiments, charge comprises holes. Moreover, in some embodiments, activating the at least one phosphor comprises generating a dielectric displacement current and placing the at least one phosphor in an excited state with the dielectric displacement current.

In some embodiments, methods of producing electromagnetic radiation comprise activating a plurality of phosphors and emitting electromagnetic radiation from the plurality of phosphors. Activating a plurality of phosphors, according to some embodiments of the present invention, comprises transferring charge from at least one electric field concentrator to the plurality of phosphors, placing the plurality of phosphors in an excited state with a dielectric displacement current, or combinations thereof.

These and other embodiments of the present invention are described in greater detail in the detailed description which follows.

DETAILED DESCRIPTION

Figure 1:
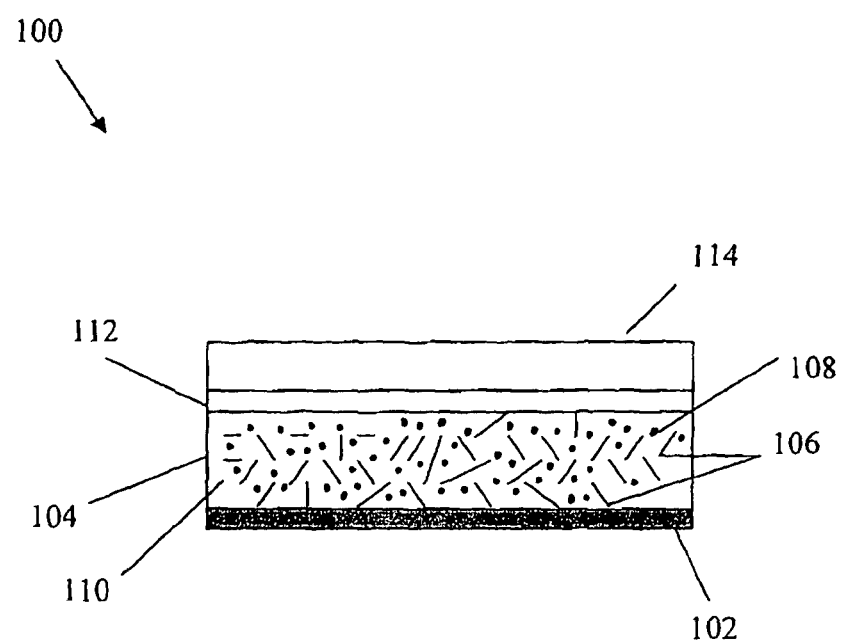
FIG. 1 illustrates a cross-sectional view of a lighting apparatus according to an embodiment of the present invention.

The present invention provides solid state compositions and systems for lighting applications. The present invention additionally provides methods of making solid state compositions and systems for lighting applications as well as methods for generating electromagnetic radiation. Lighting compositions, apparatus, and systems of the present invention offer alternatives to present lighting sources of incandescent light, fluorescent light, and LEDs.

In one embodiment, the present invention provides a lighting apparatus comprising a first electrode, a radiation transmissive second electrode, and a composite layer disposed between the first electrode and the second electrode, the composite layer comprising at least one electric field concentrator and at least one phosphor disposed in a radiation transmissive dielectric material.

Turning now to components that can be included in various embodiments of lighting apparatus of the present invention, lighting apparatus of the present invention comprise a composite layer. A composite layer, according to some embodiments of the present invention, comprises at least one electric field concentrator and at least one phosphor disposed in a radiation transmissive dielectric material. In some embodiments, a composite layer comprises a plurality of electric field concentrators and a plurality of phosphors disposed in a radiation transmissive dielectric material.

Electric field concentrators, in some embodiments, comprise high aspect ratio materials having diameters on the order of nanometers or tens of nanometers and lengths on the order of microns or millimeters. The term aspect ratio, as used herein, refers to the electric field concentrator's length divided by the electric field concentrator's diameter or width. In some embodiments, electric field concentrators demonstrate an aspect ratio ranging from about 1 to about $10^6$. In other embodiments, electric field concentrators display an aspect ratio ranging from about 10 to about 100,000. In a further embodiment, electric field concentrators have an aspect ratio ranging from about 10 to about 10,000 or from about 5 to about 1000.

Electric field concentrators, according to some embodiments of the present invention, have a length ranging from about 1 nm to about 5 mm or from about 10 nm to about 1 mm. In another embodiment, electric field concentrators have a length ranging from about 50 nm to about 500 μm, from about 100 nm to about to about 100 μm, or from about 500 nm to 10 μm. In a further embodiment, electric field concentrators have a length ranging from about 200 μm to about 500 μm.

Electric field concentrators, in some embodiments, have a diameter ranging from about 1 nm to about 100 nm. In another embodiment, electric field concentrators have a diameter ranging from about 10 nm to about 80 nm or from about 20 nm to about 60 nm. In some embodiments, electric field concentrators have a diameter greater than about 100 nm or less than about 1 nm.

Electric field concentrators, in some embodiments, comprise nanotubes. Nanotubes, in some embodiments, comprise carbon nanotubes wherein carbon nanotubes include single-walled carbon nanotubes (SWNT), multi-walled carbon nanotubes (MWNT), cut carbon nanotubes as well as doped single-walled carbon nanotubes, doped multi-walled carbon nanotubes or mixtures thereof.

In some embodiments, doped single-walled carbon nanotubes and doped multi-walled carbon nanotubes comprise boron in an amount ranging from about 0.1 weight percent to about 30 weight percent. In other embodiments, doped single-walled carbon nanotubes and doped multi-walled carbon nanotubes comprise boron in an amount ranging from about 5 weight percent to about 25 weight percent or from about 10 weight percent to about 20 weight percent. In a further embodiment, doped single-walled carbon nanotubes and doped multi-walled carbon nanotubes comprise boron in an amount less than 0.1 weight percent.

In some embodiments, doped single-walled carbon nanotubes and doped multi-walled carbon nanotubes comprise nitrogen in an amount ranging from about 0.1 weight percent to about 30 weight percent. In other embodiments, doped single-walled carbon nanotubes and doped multi-walled carbon nanotubes comprise nitrogen in an amount ranging from about 5 weight percent to about 25 weight percent or from about 10 weight percent to about 20 weight percent. In a further embodiment, doped single-walled carbon nanotubes and doped multi-walled carbon nanotubes comprise nitrogen in an amount less than 0.1 weight percent.

In another embodiment, electric field concentrators comprise metal nanowires, including transition metal nanowires. Metal nanowires, in some embodiments, comprise silver nanowires, gold nanowires, platinum metal nanowires, nickel nanowires, iron nanowires, copper nanowires, or combinations thereof.

In some embodiments, electric field concentrators of the present invention comprise semiconductor nanowires. Semiconductor nanowires, according to some embodiments, comprise II/VI semiconductors, III/V semiconductors, or mixtures thereof. In one embodiment, semiconductor nanowires comprise cadmium telluride (CdTe) nanowires, cadmium selenide (CdSe) nanowires, cadmium sulfide (CdS) nanowires, zinc sulfide (ZnS) nanowires, zinc selenide (ZnSe) nanowires, gallium arsenide (GaAs) nanowires, gallium nitride (GaN) nanowires, indium phosphide (InP) nanowires, or mixtures thereof.

In some embodiments, electric field concentrators comprise nanorods. Nanorods, in some embodiments, comprise carbon nanotubes, metal nanowires, semi-conductor nanowires, or mixtures thereof.

Electric field concentrators comprising carbon nanotubes, metal nanowires, or semiconductor nanowires, according to some embodiments, are chemically functionalized, which can enhance dispersion characteristics of the electric field concentrators in the dielectric material. In some embodiments, surfaces of electric field concentrators are chemically functionalized. Chemical functionalization, according to some embodiments of the present invention, comprises non-specific binding of electric field concentrators, such as carbon nanotubes, with one or a plurality of surfactants such as sodium dodecysulfate and/or polyethylene glycol p-(1,1,3,3-tetramethylbutyl)-phenyl ether (TRITON® X-100). In another embodiment, chemical functionalization comprises, nonspecific binding of electric field concentrators with one or a plurality of acids including sulfonic acids and/or pluronic acids or non-specific binding with one or a plurality of polymers such as poly(m-phenylenevinylene)-co-(2,5-dioctoxy-p-phenylene)vinylene (PmPV), poly(2,6-pyridinylenevinylene)-co-(2,5-dioctoxy-p-phenylene)vinylene (PPyPV), and/or poly(5-alkoxy-m-phenylenevinylene)-co-(2,5-dioctoxy-p-phenylene)vinylene (PAmPV). In a further embodiment, chemical functionalization comprises covalent bonding of electric field concentrators with one or a plurality of polyethylene glycols and/or carbonic acids.

Composite layers, according to some embodiments of the present invention, comprise electric field concentrators in an amount ranging from about 0.01 weight percent and about 99 weight percent of the composite layer. In another embodiment, a composite layer comprises electric field concentrators in an amount ranging from about 0.01 weight percent and about 50 weight percent or from about 1 weight percent and 25 weight percent of the composite layer. In a further embodiment, a composite layer comprises electric field concentrators in an amount ranging from about 0.01 weight percent to about 10 weight percent or from about 1 weight percent to about 5 weight percent of the composite layer.

Composite layers, in some embodiments, comprise mixtures of different types of electric field concentrators. In one embodiment, for example, a composite layer comprises carbon nanotube and metal nanowire electric field concentrators. In another embodiment, a composite layer comprises semiconductor nanowire electric field concentrators, metal nanowire electric field concentrators, and carbon nantoube electric field concentrators. Embodiments of composite layers of the present invention contemplate all combinations of types of electric field concentrators.

In addition to electric field concentrators, a composite layer of the present invention comprises at least one phosphor. In some embodiments, a composite layer comprises a plurality of phosphors. Phosphors, according to some embodiments of the present invention, comprise nanophosphors. Nanophosphors, in some embodiments, comprise particles having an average diameter ranging from about 1 nm to about 500 nm or from about 10 nm to about 300 nm. In another embodiment, nanophosphors comprise particles having an average diameter ranging from about 50 nm to about 250 nm, from about 75 nm to about 150 nm, or from about 5 nm to about 50 nm. In a further embodiment, nanophosphors comprise particles having an average diameter less than 1 nm or greater than 500 nm.

Phosphors, including nanophosphors, according to embodiments of the present invention, are operable to radiatively relax from an excited state. In some embodiments, phosphors emit radiation in the visible region of the electromagnetic spectrum. Phosphors, in some embodiments, emit radiation in the ultraviolet or infrared region of the electromagnetic spectrum in addition to emission in the visible region of the electromagnetic spectrum. In other embodiments, phosphors emit radiation in the ultraviolet or infrared region of the electromagnetic spectrum without emission in the visible region. Phosphors can be selected, according to embodiments of the present invention, to emit radiation having wavelengths corresponding to the colors of red, orange, yellow, green, blue, indigo, and violet.

In some embodiments, phosphors, including nanophosphors, comprise Lanthanide and Actinide series elements (rare earth emitters) such as erbium, ytterbium, dysprosium, or holmium; metals such as transition metals; metal oxides; metal sulfides; or combinations thereof. In some embodiments, phosphors comprise doped yttrium oxides ($Y_2O_3$) including $Y_2O_3$:Eu, $Y_2O_3$:Zn, and $Y_2O_3$:Ti. In other embodiments phosphors comprise doped zinc sulfides including ZnS:Cu, ZnS:Mn, ZnS:Ga, ZnS:Gd, or mixtures thereof. In another embodiment, phosphors comprise doped calcium sulfides including CaS:Er, CaS:Tb, CaS:Eu, or mixtures thereof. In a further embodiment, phosphors comprise doped zinc oxides including ZnO:Eu. In one embodiment, phosphors comprise doped strontium sulfides including SrS:Ca, SrS:Mn, SrS:Cu, or mixtures thereof.

In another embodiment, phosphors, including nanophosphors, comprise semiconductor materials. In one embodiment, semiconductor materials comprise quantum dots, the quantum dots comprising II/VI and III/V semiconductors. In some embodiments, phosphors comprise cadmium selenide (CdSe) quantum dots, cadmium telluride (CdTe) quantum dots, cadmium sulfide (CdS) quantum dots, zinc sulfide (ZnS) quantum dots, zinc selenide (ZnSe) quantum dots, gallium arsenide (GaAs) quantum dots, gallium nitride (GaN) quantum dots, indium phosphide (InP) quantum dots, or mixtures thereof. In some embodiments, the quantum dots comprise a core/shell structure wherein the core is a II/VI semiconductor and the shell is a III/V semiconductor or the core is a III/V semiconductor and the shell is a II/VI semiconductor.

In a further embodiment, phosphors can comprise organic and inorganic dyes as well as other chemical species operable to radiatively relax from an excited state. In some embodiments, organic dyes and chemical species include $H_2C_6N$ and 4-dialkylamino-1,8-naphthalimides as well as 1,8-naphthalimide derivatives and compounds, such as multibranched naphthalimide derivatives TPA-NA1, TPA-NA2, and TPA-NA3. Organic phosphor materials can also comprise 4-(dimethylamino)cinnamonitrile (cis and trans), trans-4-[4-(dimethylamino)styryl]-1-methylpyridinium iodide, 4-[4-(dimethylamino)styryl]pyridine, 4-(diethylamino)benzaldehyde diphenylhydrazone, trans-4-[4-(dimethylamino)styryl]-1-methylpyridinium p-toluenesulfonate, 2-[ethyl[4-[2-(4-nitrophenyl)ethenyl]phenyl]amino]ethanol, 4-dimethylamino-4'-nitrostilbene, Disperse Orange 25, Disperse Orange 3, and Disperse Red 1.

In some embodiments, phosphors, including nanophosphors, comprise a protective coating. A protective coating, in one embodiment, comprises glass. In other embodiments, phosphor protective coatings comprise dendron ligands and/or other dendritic structures as well as shells comprising semiconductors or metal oxides. Protective coatings, in some embodiments, associated with phosphors of the present invention do not substantially interfere or attenuate the radiative emission of the phosphor.

In some embodiments, protective coatings can enhance dispersion characteristics of the phosphors in the dielectric material. In other embodiments, phosphors, including nanophosphors, can be chemically functionalized, which can enhance dispersion characteristics of the phosphors in the dielectric material. In some embodiments, chemical functionalization is administered in addition to one or more protective coatings.

Composite layers, according to some embodiments of the present invention, comprise phosphors in an amount ranging from about 0.01 weight percent and about 99 weight percent of the composite layer. In another embodiment, a composite layer comprises phosphors in an amount ranging from about 0.01 weight percent and about 50 weight percent or from about 1 weight percent to about 25 weight percent of the composite layer. In a further embodiment, a composite layer comprises phosphors in an amount ranging from about 0.01 weight percent to about 10 weight percent or from about 1 weight percent to about 5 weight percent of the composite layer.

As described herein, composite layers of the present invention comprise at least one electric field concentrator and at least one phosphor disposed in a radiation transmissive dielectric material. In some embodiments, a plurality of electric field concentrators and phosphors are disposed in a radiation transmissive dielectric material. In some embodiments, a radiation transmissive dielectric material has a dielectric constant ranging from greater than about 1 to about 10. In another embodiment, a radiation transmissive dielectric material has a dielectric constant greater than about 10.

A radiation transmissive dielectric material, in some embodiments, comprises a polymeric material. In one embodiment, a polymeric material comprises fluorinated polymers such as polyvinylidene fluoride (PVDF), poly(vinyl fluoride) (PVF), polytetrafluoroethylene (PTFE), perfluoropropylene, polychlorotrifluoroethylene (PCTFE), or copolymers and combinations thereof. In some embodiments, a polymeric material comprises polyacrylates including polyacrylic acid (PAA), poly(methacrylate) (PMA), poly(methylmethacrylate) (PMMA), or copolymers and combinations thereof. In other embodiments, a polymeric material comprises polyethylenes, polypropylenes, polystyrenes, poly(vinylchloride), polycarbonates, polyamides, polyimides, or copolymers and combinations thereof. Polymeric dielectric materials, according to embodiments of the present invention, contemplate any suitable molecular weight ($M_w$) and polydispersity as understood by one of skill in the art.

Electric field concentrators and phosphors, in some embodiments, are disposed in the radiation transmissive dielectric material through blending with the dielectric material. Blending electric field concentrators and phosphors with the radiation transmissive dielectric material results in dispersion of the electric field concentrators and phosphors throughout the dielectric material.

In some embodiments wherein the radiation transmissive dielectric material comprises a polymeric material, blending electric field concentrators and phosphors into the polymeric material can be accomplished in solution phase. Solution phase blending, in one embodiment, comprises adding a polymeric material to a first solvent, adding electric field concentrators to a second solvent, and adding phosphors to a third solvent. The three resulting solutions are blended into a single solution wherein the electric field concentrators and phosphors are dispersed in the polymeric phase. Solvents are subsequently removed to form the composite layer. Embodiments of blending electric field concentrators and phosphors into a polymeric material contemplate additional solution phase procedures such as having one or more of the components in the same solvent prior to blending with one or more additional solvents.

In other embodiments, blending of the components of the composite layer can be accomplished with polymeric melts and solvents. In further embodiments, blending of electric field concentrators and phosphors with the polymeric material can be accomplished through ultrasonic blending and gelation, extrusion, double screw, and chaotic advection.

In some embodiments of a composite layer of a lighting apparatus of the present invention, one or a plurality of electric field concentrators are disposed in a first layer of a first radiation transmissive dielectric material, and one or a plurality of phosphors are disposed in a second layer of a second radiation transmissive dielectric material. Electric field concentrators, phosphors, and first and second radiation transmissive dielectric materials, in such embodiments, comprise those provided hereinabove. The first and second radiation transmissive dielectric materials, in some embodiments, comprise the same material. In other embodiments, the first and second radiation transmissive dielectric materials comprise different materials. The first and second radiation transmissive dielectric materials, in some embodiments, comprise polymeric materials consistent with those provided hereinabove.

In some embodiments, a composite layer comprising one or more electric field concentrators disposed in a first layer of a first radiation transmissive dielectric material and one or more phosphors disposed in a second layer of a second radiation transmissive dielectric material further comprises at least one additional layer comprising one or more electric field concentrators and/or phosphors disposed in an additional radiation transmissive dielectric material.

A composite layer, according to some embodiments of the present invention, can display any number of dielectric layers arranged in any manner, the dielectric layers independently comprising a plurality of electric field concentrators and/or a plurality phosphors. In some embodiments of a composite layer, an interfacial layer is present between a first radiation transmissive dielectric layer comprising a plurality of electric field concentrators and a second radiation transmissive dielectric layer comprising a plurality of phosphors. The interfacial layer can comprise a mixture of electric field concentrators and phosphors.

In some embodiments, as provided herein, a plurality of phosphors can be disposed in a non-dielectric material. A composite layer, in some embodiments, can display any number of dielectric layers independently comprising a plurality of electric field concentrators and/or a plurality of phosphors arranged in any manner with any number of non-dielectric layers comprising a plurality of phosphors.

The ability of a composite layer to display any number of independently constructed dielectric layers arranged in any manner, the dielectric layers each comprising a plurality of electric field concentrators and/or a plurality of phosphors, enables the tailoring of lighting apparatus to meet the requirements of specific applications.

In some embodiments, for example, a lighting apparatus of the present invention may be required to have the capability to operate on AC voltage or DC voltage. In order to accommodate such a requirement, a composite layer of a lighting apparatus, in one embodiment, can comprise one or more electric field concentrators disposed in a first layer of a first radiation transmissive dielectric material, wherein the first layer is interposed between a second layer comprising one or more AC electroluminescent phosphors disposed in a second radiation transmissive dielectric material and a third layer comprising one or more DC electroluminescent phosphors disposed in a third radiation transmissive dielectric material.

Alternatively, a composite layer of a lighting apparatus of the present invention, can comprise an AC electroluminescent layer and a DC electroluminescent layer, the AC electroluminescent layer comprising at least one electric field concentrator and at least one AC electroluminescent phosphor disposed in a first radiation transmissive dielectric material and the DC electroluminescent layer comprising at least one electric field concentrator and at least one DC electroluminescent phosphor disposed in a second radiation transmissive dielectric material.

In some embodiments of composite layers of a lighting apparatus of the present invention, one or a plurality of electric field concentrators are disposed in a first layer of a first radiation transmissive dielectric material and one or a plurality of phosphors are disposed in a second layer of a radiation transmissive non-dielectric material. A radiation transmissive, non-dielectric material, in some embodiments, comprises conjugated polymers, semiconducting polymers or combinations thereof. In some embodiments, phosphors disposed in the radiation transmissive, non-dielectric material comprise a dielectric coating.

Composite layers, in some embodiments, have a thickness ranging from about 10 nm to about 500 μm. In other embodiments, composite layers have a thickness ranging from about 50 nm to about 300 μm or from about 100 nm to about 250 μm. In another embodiment, a composite layer has a thickness ranging from about 150 nm to about 100 μm. In a further embodiment, a composite layer has a thickness ranging from about 500 nm to about 10 μm.

In addition to a composite layer, a lighting apparatus of the present invention comprises a first electrode and a radiation transmissive second electrode. In some embodiments, the first electrode comprises a metal. Metals suitable for use as an electrode, according to embodiments of the present invention, comprise elemental metals, e.g., gold, copper, platinum, etc., as well as metal alloys comprising materials composed of two or more elementally pure materials. In some embodiments, the first electrode comprises a transition metal including gold, silver, copper, nickel, iron, or alloys thereof. In another embodiment, the first electrode comprises aluminum.

The first electrode can have any desired thickness. In some embodiments, the first electrode has a thickness ranging from about 100 nm to about 1 mm. In other embodiments, the first electrode has a thickness ranging from about 250 nm to about 750 μm of from about 500 nm to about 500 μm. In another embodiment, the first electrode has a thickness ranging from about 1 μm to about 300 μm. In a further embodiment, the first electrode has a thickness less than about 100 nm or greater than 1 mm. In one embodiment, the first electrode has a thickness operable to at least partially pass visible electromagnetic radiation. Moreover, in some embodiments, the first electrode can be reflective permitting reflection of electromagnetic radiation produced in the composite layer.

In some embodiments, the first electrode is radiation transmissive. In some embodiments, the radiation transmissive first electrode comprises a radiation transmissive conducting oxide. Radiation transmissive conducting oxides, in some embodiments, comprise indium tin oxide (ITO), gallium indium tin oxide (GITO), zinc indium tin oxide (ZITO), indium antimony oxide (IAO), and antimony tin oxide (ATO). In another embodiment, a radiation transmissive first electrode comprises a radiation transmissive polymeric material such as polyanaline (PANI) and its chemical relatives.

In some embodiments, 3,4-polyethylenedioxythiophene (PEDOT:PSS) can be a suitable radiation transmissive polymeric material for a radiation transmissive first electrode. In one embodiment, PEDOT:PSS composites comprising nanoparticles, such as carbon nanotubes, dispersed in PEDOT:PSS can serve as a suitable radiation transmissive polymeric material for the first electrode. In some embodiments, PEDOT:PSS composite electrodes comprise carbon nanotubes in an amount ranging from about 0.01 weight percent to about 80 weight percent of the composite electrode. In another embodiment, a PEDOT:PSS composite electrode comprises carbon nanotubes in an amount ranging from about 0.1 weight percent to about 10 weight percent or from about 0.5 weight percent to about 5 weight percent of the electrode.

A radiation transmissive second electrode, according to some embodiments, comprises a radiation transmissive conducting oxide. Radiation transmissive conducting oxides, in some embodiments, comprise indium tin oxide (ITO), gallium indium tin oxide (GITO), zinc indium tin oxide (ZITO), antimony tin oxide (ATO), and indium antimony oxide (IAO). In another embodiment, the radiation transmissive second electrode comprises a radiation transmissive polymeric material such as polyanaline (PANI) and its chemical relatives. In a further embodiment, a radiation transmissive second electrode can comprise a metal or carbon nanotube layer having a thickness operable to at least partially pass visible electromagnetic radiation.

In some embodiments, 3,4-polyethylenedioxythiophene (PEDOT:PSS) can be a suitable radiation transmissive polymeric material for the second electrode. In one embodiment, PEDOT:PSS composites comprising nanoparticles, such as carbon nanotubes, dispersed in PEDOT:PSS can serve as a suitable radiation transmissive polymeric material for the second electrode. In some embodiments, PEDOT:PSS composite electrodes comprise carbon nanotubes in an amount ranging from about 0.01 weight percent to about 80 weight percent of the composite electrode. In another embodiment, a PEDOT:PSS composite electrode comprises carbon nanotubes in an amount ranging from about 0.1 weight percent to about 10 weight percent or from about 0.5 weight percent to about 5 weight percent of the electrode.

In some embodiments, the radiation transmissive second electrode has a thickness ranging from about 1 μm to about 500 μm. In other embodiments, the radiation transmissive second electrode has a thickness ranging from about 10 μm to about 300 μm or from about 50 μm to about 250 μm. In another embodiment, the radiation transmissive second electrode has a thickness ranging from about 100 μm to about 200 μm. In a further embodiment, the radiation transmissive second electrode has a thickness less than about 1 μm or greater than about 500 μm.

In some embodiments, a lighting apparatus further comprises a first protective layer adjacent to the radiation transmissive second electrode. The first protective layer, according to embodiments of the present invention, is radiation transmissive. In some embodiments, the protective layer comprises a polymeric material such as polycarbonate, polyethylene, polypropylene, polyacrylate, polyurethane, polyester, polyamide, or copolymers or combinations thereof. The protective layer can have any desired thickness, often depending on application of the lighting apparatus. In embodiments where the lighting apparatus is used in high impact or other harsh environments, for example, the protective layer can have a substantial thickness. In less demanding environments, the protective layer can be thinner.

In one embodiment, the first protective layer has a thickness ranging from about 1 μm to about 10 mm. In another embodiment, the first protective layer has a thickness ranging from about 10 μm to about 1 mm or from about 100 μm to about 800 μm In some embodiments, the first protective layer has a thickness ranging from about 250 μm to about 500 μm. In a further embodiment, the first protective layer has a thickness less than about 1 μm or greater than about 10 mm.

In some embodiments, a lighting apparatus of the present invention has a second protective layer adjacent to the first electrode. The second protective layer, in some embodiments, comprises materials consistent with those described herein for the first protective layer.

In some embodiments, a lighting apparatus further comprises one or more radiation transmissive dielectric layers between the composite layer and the first electrode and/or second electrode. One or more dielectric layers disposed between the composite layer and the first and/or second electrode, in some embodiments, can serve as a buffer layer preventing or inhibiting dielectric breakdown of the lighting apparatus.

In some embodiments, radiation transmissive dielectric buffer layers can be disposed within the composite layer of a lighting apparatus. In one embodiment, for example, a radiation transmissive dielectric buffer layer can be disposed between a first layer comprising one or a plurality of electric field concentrators disposed in a first radiation transmissive dielectric material and a second layer comprising one or a plurality of phosphors disposed in a second radiation transmissive dielectric material. In another embodiment, a radiation transmissive dielectric buffer layer can be disposed between a first layer comprising at least one electric field concentrator and at least one phosphor disposed in a first radiation transmissive dielectric material and a second layer comprising at least one electric field concentrator and at least one phosphor disposed in a second radiation transmissive dielectric material.

Radiation transmissive dielectric buffer layers, in some embodiments, comprise polymeric materials, ceramic materials, or combinations thereof. In some embodiments, a polymeric dielectric material comprises those polymers described herein for use in the composite layer including poly(methylmethacrylate), poly(vinylidene fluoride), poly(ethylene oxide), polycarbonate, or copolymers thereof. A ceramic material, in some embodiments, comprises silicon oxide, aluminum oxide, or combinations thereof. In some embodiments, a radiation transmissive dielectric buffer layer comprise substantially no electric field concentrators or phosphors. In one embodiment, a radiation transmissive dielectric buffer layer does not comprise any electric field concentrators or phosphors.

In some embodiments, a radiation transmissive dielectric buffer layer has a thickness ranging from about 1 µm to about 500 µm or from about 100 µm to about 400 µm. In other embodiments, a radiation transmissive dielectric buffer layer has a thickness ranging from about 100 µm to about 300 µm. In a further embodiment, radiation transmissive buffer layer has a thickness less than about 1 µm or greater than about 500 µm.

In some embodiments, a dielectric buffer layer disposed between the composite layer is not radiation transmissive. In such embodiments, the dielectric layer can comprise a polymeric material including conjugated polymers such as polythiophenes and polyanilines.

FIG. 1 illustrates a cross-sectional view of a lighting apparatus according to one embodiment of the present invention. The lighting apparatus (100) illustrated in FIG. 1 comprises a first electrode (102) and a radiation transmissive second electrode (112). A composite layer (104) is disposed between the first electrode (102) and the radiation transmissive second electrode (112). In the embodiment shown in FIG. 1, the composite layer (104) contacts the interior face of the first electrode (102) and the interior face of the radiation transmissive second electrode (112). The composite layer (104) comprises a plurality of electric field concentrators (106) and a plurality of phosphors (108) dispersed throughout a radiation transmissive dielectric polymeric material (110). A protective layer (114) is placed adjacent to the radiation transmissive second electrode.

Figure 2:
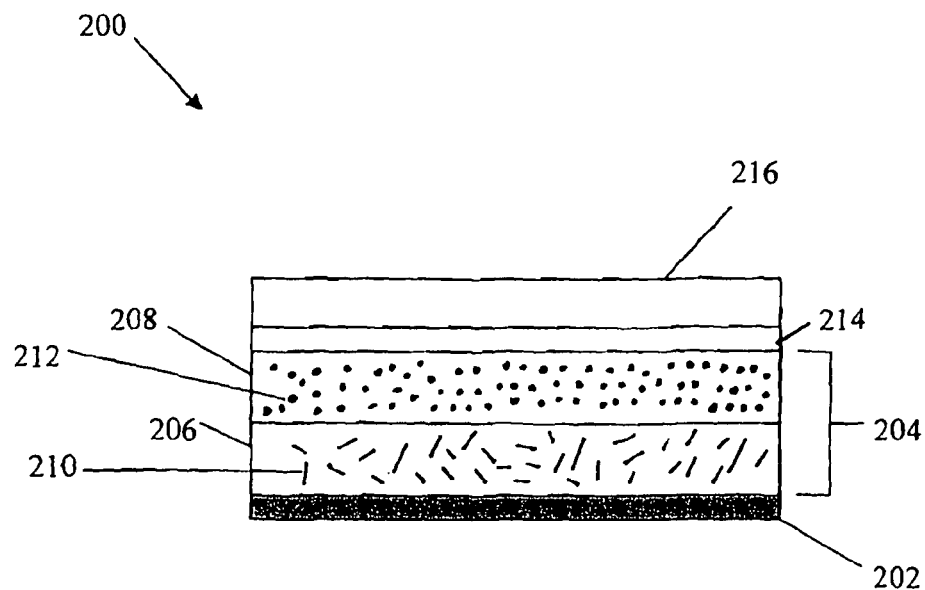
FIG. 2 illustrates a cross-sectional view of a lighting apparatus according to an embodiment of the present invention.

FIG. 2 illustrates a cross-sectional view of a lighting apparatus according to another embodiment of the present invention. The lighting apparatus (200) illustrated in FIG. 2 comprises a first electrode (202) and a radiation transmissive second electrode (214). A composite layer (204) is disposed between the first electrode (202) and the radiation transmissive second electrode (214). The composite layer (204) comprises a first layer of a first radiation transmissive dielectric material (206) and a second layer of a second radiation transmissive dielectric material (208). In the embodiment illustrated in FIG. 2, electric field concentrators (210) are disposed in the first radiation transmissive dielectric material (206) and phosphors (212) are disposed in the second radiation transmissive dielectric material (208). A protective layer (216) is placed adjacent to the radiation transmissive second electrode (214).

Figure 3:
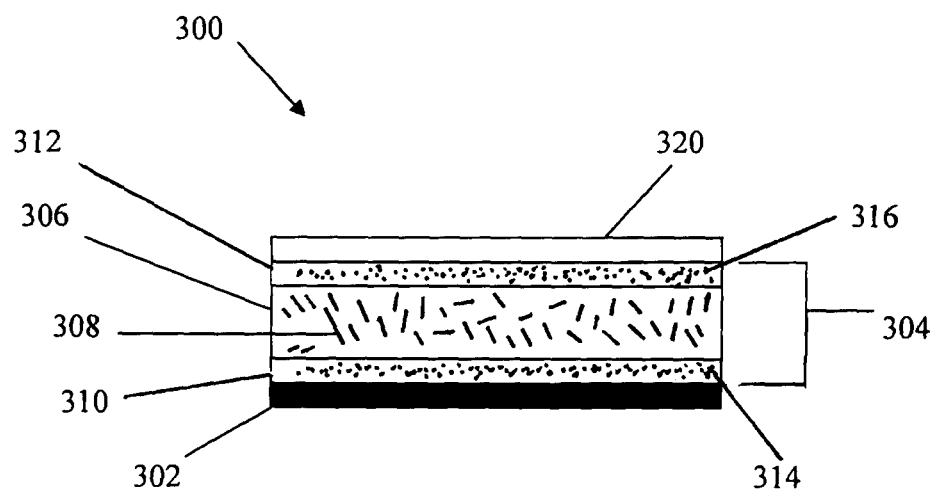
FIG. 3 illustrates a cross-sectional view of a lighting apparatus according to an embodiment of the present invention.

FIG. 3 illustrates a cross-sectional view of a lighting apparatus according to another embodiment of the present invention. The lighting apparatus (300) illustrated in FIG. 3 comprises a first electrode (302) and a radiation transmissive second electrode (320). A composite layer (304) is disposed between the first electrode (302) and the radiation transmissive second electrode (320). The composite layer (304) comprises a first layer (306) comprising a plurality of electric field concentrators (308) disposed in a first radiation transmissive dielectric material. The composite layer (304) additionally comprises second (310) and third (312) layers on either side of the first layer (306). The second layer (310) comprises a plurality of phosphors (314) disposed in a second radiation transmissive dielectric material, and the third layer (312) comprises a plurality of phosphors (316) disposed in a third radiation transmissive dielectric material.

Figure 4:
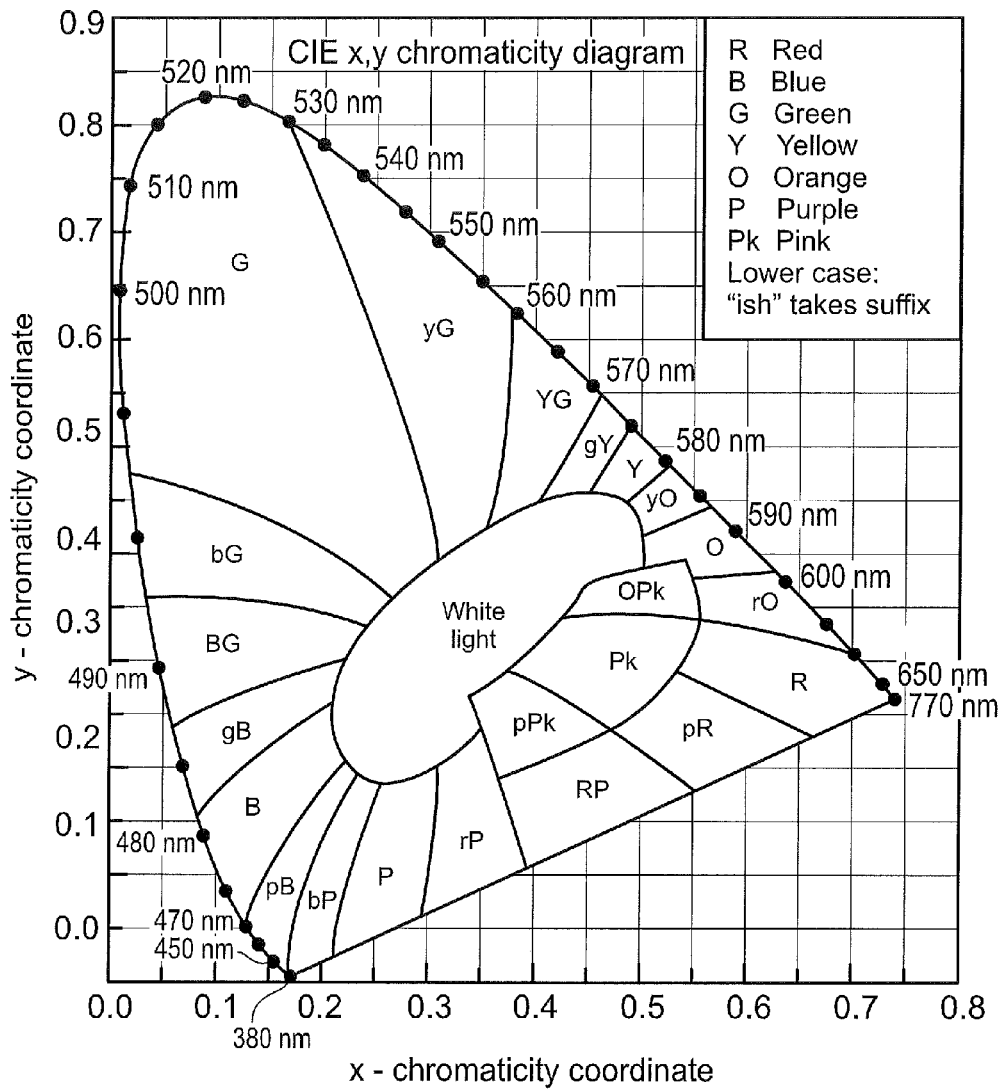
FIG. 4 illustrates the CIE chromaticity scale.

Lighting apparatus, according to embodiments of the present invention, are operable to emit white light as well as colors of light. In some embodiments, the chromaticity of the electromagnetic radiation provided by a lighting apparatus of the present invention is governed by the radiative emission characteristics of the phosphors dispersed in the radiation transmissive dielectric material of the composite layer. In some embodiments, phosphors having the same or similar emission spectra are dispersed throughout the radiation transmissive dielectric material to produce an individual color of light. In another embodiment, phosphors having divergent emission spectra can be mixed in various ratios to produce white light. In one embodiment, for example, red, green and blue emitting phosphors can be mixed to produce various colors of light as well as white light. The chromaticity of the light provided by a lighting apparatus of the present invention can be determined on the CIE chromaticity scale. FIG. 4 illustrates the CIE chromaticity scale, including coordinates for various colors of light. Embodiments of the present invention contemplate combinations of phosphors to produce any color of light on the CIE chromaticity scale including white light.

A lighting apparatus of the present invention comprising a first electrode, a radiation transmissive second electrode, and a composite layer disposed between the first electrode and the second electrode, the composite layer comprising at least one electric field concentrator and at least one phosphor disposed in a radiation transmissive dielectric material, according to some embodiments, has an efficiency greater than 90 lumens per Watt. In some embodiments, a lighting apparatus has an efficiency greater than 100 lumens per Watt. In another embodiment, a lighting apparatus has an efficiency ranging from about 100 lumens per Watt to about 200 lumens per Watt. In a further embodiment, a lighting apparatus has an efficiency ranging from about 120 lumens per Watt to about 160 lumens per Watt. In another embodiment, a lighting apparatus has an efficiency greater than 200 lumens per Watt.

In some embodiments, a lighting apparatus of the present invention has a lifetime greater than 20,000 hours of continuous operation. In another embodiment, a lighting apparatus of the present invention has a lifetime greater than 30,000 hours of operation.

In some embodiments, lighting apparatus of the present invention can be fabricated to the dimensions of various lighting applications. In one embodiment, a lighting apparatus has a frontal surface area ranging from about 1 cm$^2$ to about 100 cm² or from about 5 cm² to about 50 cm² In another embodiment, a lighting apparatus has a frontal surface area of about 1 m². In a further embodiment, a lighting apparatus has a frontal surface area greater than about 1 m² or less than about 1 cm².

Lighting apparatus as described herein, in some embodiments, are flexible. In such embodiments, the flexible nature permits lighting apparatus to be rolled into sheets, bent, curved, or otherwise configured in a manner not applicable to rigid materials. Moreover, in some embodiments, lighting apparatus of the present invention can be cut or scored without inactivating or rendering inoperable the lighting apparatus. As a result, lighting apparatus of the present invention can be sized to fit any application.

Lighting apparatus of the present invention find application as back-lighting for panel or liquid crystal applications and displays, automotive lighting, aircraft lighting, commercial lighting, industrial lighting, home and ornamental lighting, including wallpaper lighting, and office and laboratory lighting. In some embodiments, lighting apparatus of the present invention find application in mobile lighting, recreational, and outdoor lighting. In another embodiment, lighting apparatus of the present invention can be used as window panes, in window panes, or other glass applications. In such embodiments, when the lighting apparatus is off the lighting apparatus is radiation transmissive. When turned on, however, the lighting apparatus emits the desired color or colors of light. In some embodiments, the lighting apparatus emits white light when turned on.

In a further embodiment, lighting apparatus of the present invention find use in military lighting applications such as battle lighting systems in aircrafts, ships, and submarines. In one embodiment, lighting apparatus of the present invention find application in battle lantern systems. Moreover, in some embodiments, lighting apparatus of the present invention find use in spectrally sensitive applications such as greenhouse lighting and medical applications including photo-therapeutic bandaging.

In another aspect, the present invention provides a lighting system comprising at least one lighting apparatus and at least one electrical circuit coupled to the lighting apparatus. In some embodiments of lighting systems of the present invention, the at least one lighting apparatus comprises a first electrode, a radiation transmissive second electrode, and a composite layer disposed between the first electrode and the second electrode, wherein the composite layer comprises at least one electric field concentrator and at least one phosphor disposed in a radiation transmissive dielectric material. The composite layer, in some embodiments, comprises at least one electric field concentrator disposed in a first layer of a first radiation transmissive dielectric material and at least one phosphor disposed in a second layer of a second radiation transmissive dielectric material. In some embodiments, a plurality of electrical circuits are coupled to the at least one lighting apparatus.

In another embodiment, a lighting system of the present invention, comprises a plurality of lighting apparatus coupled to at least one electrical circuit. In some embodiments, the at least one electrical circuit is the same for each of the plurality of lighting apparatus. In other embodiments, the at least one electrical circuit is different for each of the plurality of lighting apparatus. In embodiments wherein the at least one electrical circuit is different for each of the plurality of lighting apparatus, coordinated or random lighting displays can be produced based on the simultaneous or non-simultaneous application of voltage to each of the plurality of lighting apparatus.

In some embodiments, the operating voltage of a lighting system of the present invention is 120 VAC +/−10% of nominal. In another embodiments, the operating voltage of a lighting system of the present invention ranges from about 10 VAC to about 220 VAC. In another embodiment, the operating voltage of a lighting system of the present invention ranges from about 20 VAC to about 440 VAC.

Moreover, in some embodiments, the frequency of the electric field resulting from the applied VAC ranges from about 16 Hz to about 16000 Hz. In other embodiments, the frequency of the electric field is about 50 Hz or about 60 Hz. In another embodiment, the frequency of the electric field is about 200 Hz or about 400 Hz. In a further embodiment, the frequency of the electric field is about 800 Hz or about 1200 Hz. In one embodiment, the frequency of the electric filed is about 1600 Hz.

In some embodiments, the frequency of the electric field is chosen to increase or maximize the dielectric displacement current of the dielectric material(s) of the composite layer. In one embodiment, for example, the frequency of the electric field matches the natural resonance frequency of a dielectric material in the composite layer.

In other embodiments, lighting apparatus of the present invention are operable to receive DC operating voltages ranging from about 5 V to about 1000 V or from about 100 V to about 500 V. In another embodiment, a lighting apparatus of the present invention has a DC operating voltage of about 12 V.

Lighting systems, according to some embodiments, further comprise housings and/or fixtures for one or a plurality of lighting apparatus. Housings and/or fixtures, in some embodiments, comprise protective covers, panels, tiles, frames, or other enclosures.

In another aspect, the present invention provides methods of producing lighting apparatus and systems. In one embodiment, a method of producing a lighting apparatus comprises providing a first electrode, providing a radiation transmissive second electrode, providing a composite layer, and disposing the composite layer between the first electrode and the second electrode, wherein the composite layer comprises at least one electric field concentrator and at least one phosphor disposed in a radiation transmissive dielectric material. In some embodiments, the composite layer comprises a plurality of electric field concentrators and a plurality of phosphors disposed in a radiation transmissive dielectric material. The composite layer, in other embodiments, comprises at least one electric field concentrator disposed in a first layer of a first radiation transmissive dielectric material and at least one phosphor disposed in a second layer of a second radiation transmissive dielectric material.

In some embodiments, methods of producing a lighting apparatus further comprises disposing at least one dielectric buffer layer between the composite layer and the first and/or second electrode.

In some embodiments, providing a composite layer comprises disposing at least one electric field concentrator and at least one phosphor in a radiation transmissive dielectric material. In other embodiments, providing a composite layer comprises disposing at least one electric field concentrator in a first layer of a first radiation transmissive dielectric material and disposing at least one phosphor in a second layer of a second radiation transmissive dielectric material adjacent to the first layer.

A method of producing a lighting system, in some embodiments, comprises providing at least one lighting apparatus and coupling the at least one lighting apparatus to at least one electrical circuit. Lighting apparatus suitable for coupling to at least one electrical circuit can comprise any of the lighting apparatus described herein. In one embodiment, a lighting apparatus comprises a first electrode, a radiation transmissive second electrode, and a composite layer disposed between the first electrode and the second electrode, the composite layer comprising at least one electric field concentrator and at least one phosphor disposed in a radiation transmissive dielectric material. The composite layer, in some embodiments, comprises at least one electric field concentrator disposed in a first layer of a first radiation transmissive dielectric material and at least one phosphor disposed in a second layer of a second radiation transmissive dielectric material. In some embodiments, a method of producing a lighting system comprises coupling at least one lighting apparatus to a plurality of electrical circuits.

In another embodiment, a method of producing a lighting system comprises providing a plurality of lighting apparatus of the present invention and coupling each of the plurality of lighting apparatus to at least one electrical circuit. In some embodiments, the at least one electrical circuit is the same for each of the plurality of lighting apparatus. In other embodiments, the at least one electrical circuit is different for each of the plurality of lighting apparatus.

In a further aspect, the present invention provides methods of producing electromagnetic radiation. In one embodiment, a method for producing electromagnetic radiation comprises providing a composite layer comprising at least one electric field concentrator and at least one phosphor disposed in a radiation transmissive dielectric material, disposing the composite layer in an electric field, activating the at least one phosphor, and emitting electromagnetic radiation from the at least one phosphor. The composite layer, in some embodiments, comprises at least one electric field concentrator disposed in a first layer of a first radiation transmissive dielectric material and at least one phosphor disposed in a second layer of a second radiation transmissive dielectric material.

A method of producing electromagnetic radiation, in some embodiments, comprises providing a composite layer comprising a plurality of electric field concentrators and a plurality of phosphors disposed in a radiation transmissive dielectric material, disposing the composite layer in an electric field, activating the plurality of phosphors, and emitting electromagnetic radiation from the plurality of phosphors.

In some embodiments of methods of producing electromagnetic radiation, disposing a composite layer in an electric field comprises at least partially placing the composite layer between a first electrode and a second electrode and applying a voltage to the first and second electrodes.

Activating one or a plurality of phosphors, according to some embodiments, comprises transferring charge from at least one field concentrator to at least one phosphor. In some embodiments, charge comprises electrons. In other embodiments, charge comprises holes. In another embodiment, activating one or a plurality of phosphors comprises generating a dielectric displacement current and placing the phosphor(s) in an excited state with the dielectric displacement current. In a further embodiment, activating a plurality of phosphors comprises transferring charge from at least one electric field concentrator to the plurality of phosphors, placing the plurality of phosphors in an excited state with a dielectric displacement current, or combinations thereof.

As provided herein, electromagnetic radiation produced by methods of the present invention, in some embodiments, comprises visible electromagnetic radiation. Visible electromagnetic radiation, in some embodiments, comprises white light as well as colors of light including red, orange, yellow, green, blue, indigo, violet, or combinations thereof. In some embodiments, electromagnetic radiation comprises infrared radiation or ultraviolet radiation.

Embodiments of the present invention are further illustrated in the following Examples.

Example 1

Lighting Apparatus

A lighting apparatus, according to one embodiment of the present invention, was prepared as follows. A 3"×5" rectangle of transparent indium tin oxide (ITO) was cleaned by ultrasonication in acetone, isopropanol, and methanol for 20 minutes each and dried under vacuum at 70° C.

Poly(methylmethacrylate) (PPMA) was dissolved in chlorobenzene producing a solution having a PMMA concentration of 25 mg/mL. Electric field concentrators of clean and cut single walled carbon nanotubes obtained from Unidym Corporation of Menlo Park, Calif. were dispersed in chlorobenzene through ultrasonication at low power for 30 minutes. The resulting carbon nanotube solution was mixed with the PMMA solution to produce a polymeric material having a carbon nanotube loading of about 0.1 weight percent.

Bright white (GG84) and bright green (GGS42) electroluminescent phosphors were purchased from Sylvania Corporation of Danvers, Mass. The phosphors were mixed with the PMMA/carbon nanotube blend to produce a polymeric material having a phosphor loading of about 40 weight percent. The PMMA/carbon nanotube/phosphor material was applied to the cleaned indium tin oxide by spin coating. The resulting PMMA/carbon nanotube/phosphor layer displayed a thickness of 200 nm. The PMMA/carbon nanotube/phosphor material could also have been applied to the indium tin oxide through screen printing or doctor blading. An aluminum layer of 200 µm was subsequently vacuum deposited on the PMMA/NT/phosphor layer at a pressure of $10^{-6}$ to complete the lighting apparatus.

Example 2

Lighting Apparatus

A lighting apparatus, according to one embodiment of the present invention, was prepared as follows. A 3"×5" rectangle of transparent indium tin oxide (ITO) was cleaned by ultrasonication in acetone, isopropanol, and methanol for 20 minutes and dried under vacuum at 70° C.

Poly(methylmethacrylate) (PPMA) was dissolved in chlorobenzene producing a solution having a PMMA concentration of 25 mg/mL. Electric field concentrators of clean and cut single walled carbon nanotubes obtained from Unidym Corporation of Menlo Park, Calif. were dispersed in chlorobenzene through ultrasonication at low power for 30 minutes. The resulting carbon nanotube solution was mixed with the PMMA solution to produce a polymeric material having a carbon nanotube loading of about 0.1 weight percent. The PMMA/carbon nanotube material was applied to the cleaned indium tin oxide by spin coating producing a layer having a thickness of about 200 nm. The PMMA/carbon nanotube material could also have been applied to the indium tin oxide through screen printing or doctor blading.

Bright white (GG84) and bright green (GGS42) electroluminescent phosphors were purchased from Sylvania Corporation of Danvers, Mass. The phosphors were mixed with polyvinylidene fluoride (PVDF) to produce a polymeric material having a phosphor loading of about 40 weight percent. The PVDF/phosphor material was applied to the PMMA/carbon nanotube layer by doctor blading. The resulting PVDF/phosphor layer demonstrated a thickness of about 60 µm. An aluminum layer of 200 µm was subsequently vacuum deposited on the PVDF/phosphor layer at a pressure of $10^{-6}$ to complete the lighting apparatus.

Example 3

Lighting Apparatus

A lighting apparatus without electric field concentrators was prepared as follows. A 2.54 cm×2.54 cm indium tin oxide coated glass plate was cleaned by ultrasonication in acetone, isopropanol, and methanol for 30 minutes each and dried under a nitrogen atmosphere. Polymethylmethacrylate (PMMA) was dissolved in chlorobenzene producing a solution having a PMMA concentration of 250 mg/ml. The PMMA solution was doctor bladed onto the indium tin oxide surface and subsequently dried. The resulting PMMA layer had a thickness of about 30 µm. Bright white phosphors (GG84) were purchased from Sylvania Corporation of Danvers, Mass. The phosphors were dispersed in a dielectric binder in a 6:4 ratio of phosphor to binder. The dielectric binder was additionally purchased from Sylvania having the product designation LT35x1001. The phosphor-dielectric binder composition was doctor bladed onto the PMMA layer and dried at 150° C. in a vacuum oven. The phosphor-dielectric binder layer had a thickness of about 40 µm. An aluminum layer of about 300 µm was then disposed over the phosphor-binder layer by thermal evaporation to complete the apparatus.

Figure 5:
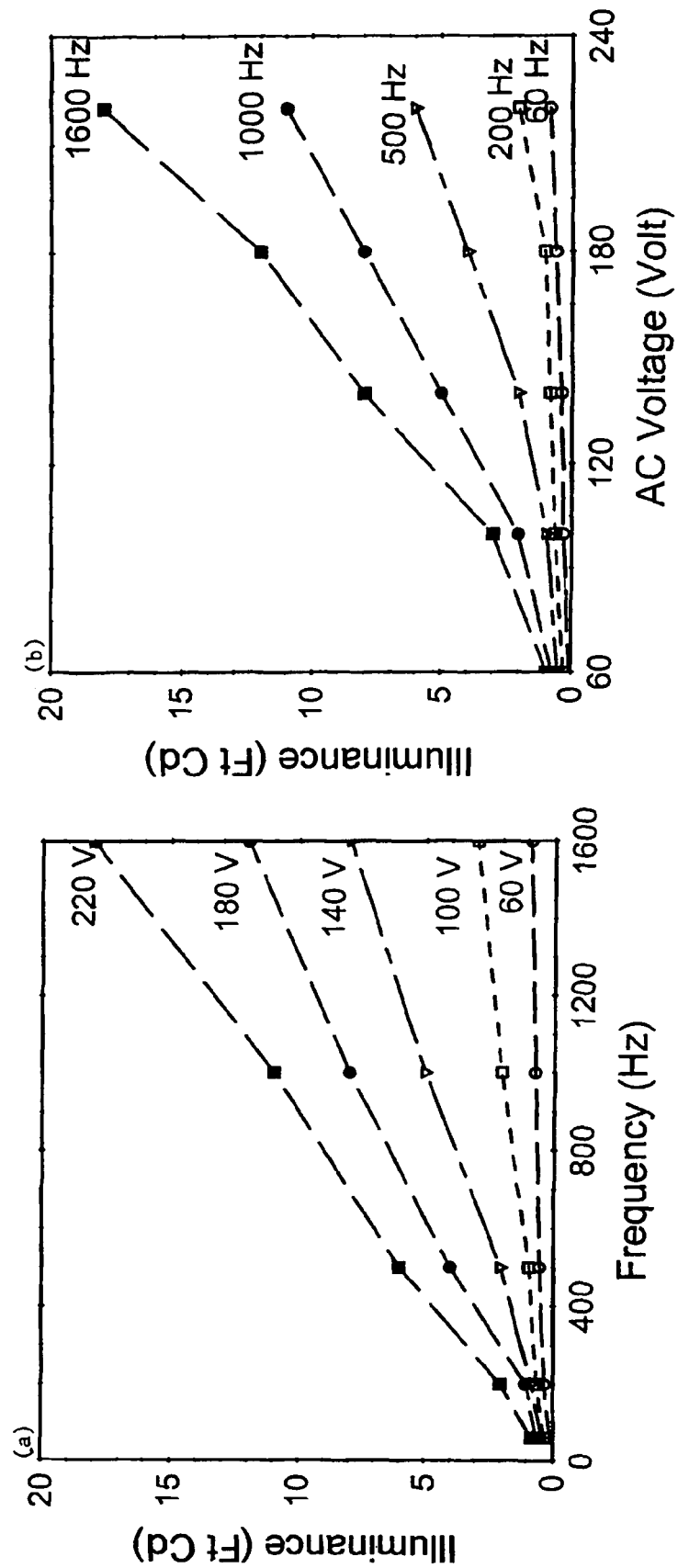
FIGS. 5(a)-(b) illustrate electroluminescent properties of lighting compositions without the presence of electric field concentrators

The apparatus was illuminated by using a function generator in conjunction with an amplifier. Illuminance at various voltages and frequencies of electric field were measured with a light meter. The results of the illuminance measurements are illustrated in FIGS. 5(*a*) and 5(*b*).

Example 4

Lighting Apparatus

A lighting apparatus with electric field concentrators was prepared as follows. A 2.54 cm×2.54 cm indium tin oxide coated glass plate was cleaned by ultrasonication in acetone, isopropanol, and methanol for 30 minutes each and dried under a nitrogen atmosphere. Polymethylmethacrylate (PMMA) was dissolved in chlorobenzene producing a solution having a PMMA concentration of 250 mg/ml. The PMMA solution was doctor bladed onto the indium tin oxide surface and subsequently dried. The resulting PMMA layer had a thickness of about 30 µm. Bright white phosphors (GG84) were purchased from Sylvania Corporation of Danvers, Mass. The phosphors were dispersed in a dielectric binder in a 6:4 ratio of phosphor to binder. The dielectric binder was additionally purchased from Sylvania having the product designation LT35x1001. The phosphor-dielectric binder composition was doctor bladed onto the dried PMMA layer and dried at 150° C. in a vacuum oven. The phosphor-dielectric binder layer had a thickness of about 40 µm.

PMMA was dissolved in chlorobenzene producing a solution having a PMMA concentration of 250 mg/ml. Electric field concentrators of clean and cut single walled carbon nanotubes were obtained from Unidym Corporation of Menlo Park, Calif. and dispersed in chlorobenzene through ultra-sonication at a low power for 30 minutes. The resulting carbon nanotube solution was mixed with the PMMA solution to produce a carbon nanotube loading of about 0.1 weight percent. The PMMA/nanotube solution was doctor bladed onto the phosphor-dielectric binder layer and dried. The resulting PMMA/nanotube layer had a thickness of about 30 µm. An aluminum layer of about 300 µm was then disposed over the PMMA/nanotube layer by thermal evaporation to complete the apparatus.

The apparatus was illuminated by using a function generator in conjunction with an amplifier. Illuminance at various voltages and frequencies of electric fields were measured with a light meter. The results of the illuminance measurements are illustrated in FIGS. 6(*a*) and 6(*b*).

Figure 6:
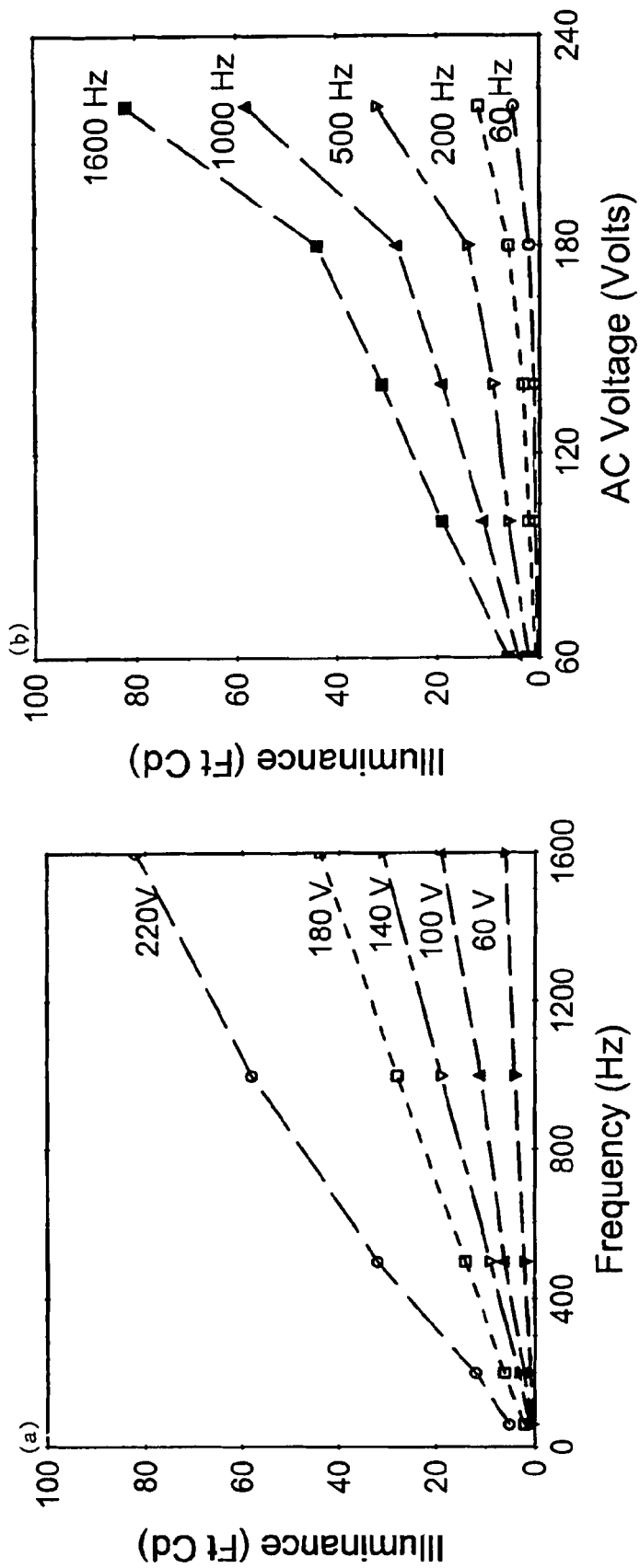
FIGS. 6(a)-(b) illustrate electroluminescent properties of lighting compositions of the present invention comprising electric field concentrators.

As demonstrated in FIGS. 5 and 6, the apparatus of Example 4 comprising electric field concentrators displayed higher illuminance values in comparison to the apparatus of Example 3, which did not contain any electric field concentrators.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

We claim:

1. A lighting apparatus comprising:
   a first electrode;
   a radiation transmissive second electrode; and
   a composite layer disposed between the first electrode and the second electrode, the composite layer comprising a first layer comprising at least one electric field concentrator disposed in a first radiation transmissive dielectric material and second and third layers on either side of the first layer, the second layer comprising a plurality of phosphors disposed in a second radiation transmissive dielectric material and the third layer comprising a plurality of phosphors disposed in a third radiation transmissive dielectric material.

2. The lighting apparatus of claim 1, wherein the at least one electric field concentrator has an aspect ratio ranging from about 1 to about $10^6$.

3. The lighting apparatus of claim 1, wherein the at least one electric field concentrator has an aspect ratio ranging from about 1 to about 100,000.

4. The lighting apparatus of claim 1, wherein the at least one electric field concentrator comprises a carbon nanotube, a metal nanowire, or a semiconductor nanowire.

5. The lighting apparatus of claim 4, wherein the carbon nanotube comprises a single-walled carbon nanotube, a multi-walled carbon nanotube, a cut carbon nanotube, a doped multi-walled carbon nanotube, or a doped single-walled carbon nanotube.

6. The lighting apparatus of claim 4, wherein the semiconductor nanowire comprises a II/VI semiconductor or a III/V semiconductor.

7. The lighting apparatus of claim 1, wherein the at least one electric field concentrator comprises a plurality of electric field concentrators.

8. The lighting apparatus of claim 7, wherein the plurality of electric field concentrators are present in the composite layer in an amount ranging from about 0.01 weight percent to about 99 weight percent.

9. The lighting apparatus of claim 7, wherein the plurality of electric field concentrators are present in the composite layer in an amount ranging from about 0.01 weight percent to about 50 weight percent.

10. The lighting apparatus of claim 7, wherein the plurality of electric field concentrators comprise single-walled carbon nanotubes, multi-walled carbon nanotubes, cut carbon nanotubes, doped multi-walled carbon nanotubes, doped single-walled carbon nanotubes, metal nanowires, semiconductor nanowires, or mixtures thereof.

11. The lighting apparatus of claim 1, wherein the at least one electric field concentrator is chemically functionalized.

12. The lighting apparatus of claim 1, wherein the phosphors of the second layer or the third layer or both comprise nanoparticles comprising a transition element, a lanthanide series element, an actinide series element, a metal oxide, or a metal sulfide.

13. The lighting apparatus of claim 1, wherein the phosphors of the second layer or the third layer or both comprise quantum dots.

14. The lighting apparatus of claim 13, wherein the quantum dots comprise a II/VI semiconductor or a III/V semiconductor.

15. The lighting apparatus of claim 1, wherein the phosphors of the second layer or the third layer comprises an organic dye or an inorganic dye.

16. The lighting apparatus of claim 1, wherein at least one of the first radiation transmissive dielectric material, second radiation transmissive dielectric material and third radiation transmissive dielectric material comprises a polymeric material.

17. The lighting apparatus of claim 16, wherein the polymeric material comprises fluoropolymers, polyacrylates, polyethylenes, polypropylenes, polystyrenes, poly(vinylchloride), polycarbonates, polyamides, polyimides, or copolymers or mixtures thereof.

18. The lighting apparatus of claim 17 wherein fluoropolymers comprise polyvinylidene fluoride, polyvinyl fluoride, polytetrafluoroethylene, perfluoropropylene, polytrichlorotrifluoroethylene, or copolymers or mixtures thereof.

19. The lighting apparatus of claim 17, wherein polyacrylates comprise polyacrylic acid, poly(methacrylate), poly(methylmethacrylate), or copolymers or mixtures thereof.

20. The lighting apparatus of claim 1, wherein the radiation transmissive second electrode comprises a radiation transmissive conducting oxide or a polymeric material.

21. The lighting apparatus of claim 20, wherein the radiation transmissive conducting oxide comprises indium tin oxide, gallium indium tin oxide, antimony tin oxide, indium antimony oxide, or zinc indium tin oxide.

22. The lighting apparatus of claim 1 further comprising a radiation transmissive dielectric layer disposed between the composite layer and the first electrode or the radiation transmissive second electrode.

23. The lighting apparatus of claim 1, wherein the apparatus has an efficiency greater than 90 lumens per Watt.

24. The lighting apparatus of claim 1, wherein the apparatus has an efficiency greater than 100 lumens per Watt.

25. The lighting apparatus of claim 1, wherein the apparatus has an efficiency ranging from about 120 lumens per Watt to about 160 lumens per Watt.

26. The lighting apparatus of claim 1, wherein the apparatus has a lifetime greater than about 20,000 hours of continuous operation.

27. The lighting apparatus of claim 1, wherein the apparatus has a frontal surface area ranging from about 1 $cm^2$ to about 100 $cm^2$.

28. The lighting apparatus of claim 1, wherein the apparatus has a frontal surface area of greater than about 1 $m^2$.

29. A lighting system comprising:
at least one lighting apparatus; and
at least one electrical circuit coupled to the at least one lighting apparatus, the lighting apparatus comprising a first electrode, a radiation transmissive second electrode, and a composite layer disposed between the first electrode and the second electrode, wherein the composite layer comprises a first layer comprising at least one electric field concentrator disposed in a first radiation transmissive dielectric material and second and third layers on either side of the first layer, the second layer comprising a plurality of phosphors disposed in a second radiation transmissive dielectric material and the third layer comprising a plurality of phosphors disposed in a third radiation transmissive dielectric material.

30. The lighting system of claim 29, wherein the at least one electrical circuit comprises a plurality of electrical circuits coupled to the at least one lighting apparatus.

31. The lighting system of claim 29, wherein an operating voltage for the lighting system is 120 VAC +/−10% of nominal.

32. The lighting system of claim 29, wherein an operating voltage of the lighting system ranges from about 10 VAC to 220 VAC.

33. The lighting system of claim 29, wherein an operating voltage of the lighting system ranges from about 20 VAC to about 440 VAC.

34. A method of producing a lighting apparatus comprising:
providing a first electrode;
providing a radiation transmissive second electrode;
providing a composite layer; and
disposing the composite layer between the first electrode and the second electrode, the composite layer comprising a first layer comprising at least one electric field concentrator disposed in a first radiation transmissive dielectric material and second and third layers on either side of the first layer, the second layer comprising a plurality of phosphors disposed in a second radiation transmissive dielectric material and the third layer comprising a plurality of phosphors disposed in a third radiation transmissive dielectric material.

35. A method of producing a lighting system comprising:
providing at least one lighting apparatus; and
coupling the at least one lighting apparatus to at least one electrical circuit, wherein the lighting apparatus comprises a first electrode, a radiation transmissive second electrode, and a composite layer disposed between the first electrode and the second electrode, the composite layer comprising a first layer comprising at least one electric field concentrator disposed in a first radiation transmissive dielectric material and second and third layers on either side of the first layer, the second layer comprising a plurality of phosphors disposed in a second radiation transmissive dielectric material and the third layer comprising a plurality of phosphors disposed in a third radiation transmissive dielectric material.

36. The method of claim 35, wherein the at least one lighting apparatus comprises a plurality of lighting apparatus.

37. The lighting system of claim 29 further comprising a radiation transmissive dielectric layer disposed between the composite layer and the first electrode or the radiation transmissive second electrode.

38. The method of claim 34 further comprising disposing a radiation transmissive dielectric layer disposed between the composite layer and the first electrode or the radiation transmissive second electrode.

39. The method of claim 35 wherein a radiation transmissive dielectric layer is disposed between the composite layer and the first electrode or the radiation transmissive second electrode.

* * * * *